United States Patent [19]

Raets

[11] Patent Number: 5,777,859
[45] Date of Patent: Jul. 7, 1998

[54] VOLTAGE CONVERTER

[75] Inventor: Hubert Raets, Landgraaf, Netherlands

[73] Assignee: U.S. Philips Corporation, New York, N.Y.

[21] Appl. No.: 693,035

[22] Filed: Aug. 6, 1996

[30] Foreign Application Priority Data

Aug. 16, 1995 [DE] Germany ............... 195 29 941.8

[51] Int. Cl.$^6$ .................. H02M 3/335; H02M 7/538
[52] U.S. Cl. .................................. 363/24; 363/133
[58] Field of Search ........................ 363/21, 22, 24, 363/25, 97, 131, 133

[56] References Cited

U.S. PATENT DOCUMENTS

| | | | |
|---|---|---|---|
| 4,334,267 | 6/1982 | Miko | 363/133 |
| 4,661,896 | 4/1987 | Kobayashi et al. | 363/24 |
| 4,783,795 | 11/1988 | Yahata | 378/105 |
| 5,459,650 | 10/1995 | Noro | 363/24 |

OTHER PUBLICATIONS

"Comparison of Resonant Topologies in High–Voltage DC Applications", S.D. Johnson et al. IEEE Transactions on Aerospace and Electronic Systems 24 (1988), May, No. 3, New York.

*Primary Examiner*—Matthew V. Nguyen
*Attorney, Agent, or Firm*—Edward Blocker

[57] ABSTRACT

In a voltage converter for converting an AC input voltage into a DC high voltage and further DC power supply voltages, in which the AC voltage applied to the converter is applied to a rectifier arrangement (1, 2, 3, 4) whose output signal is coupled to two consecutively switched electronic switches (6, 7), and in which this DC voltage is converted into the DC high voltage and into the DC power supply voltages, the circuit arrangement has a simple structure in that a series arrangement of a capacitance (8), an inductance (9) and a primary winding (10) of a transformer (11) is arranged in parallel with one of the electronic switches (6, 7), in that a secondary winding (12) of the transformer (11) precedes a capacitance (15) at the output end, in that a control circuit (20) is provided which controls the switching frequency of the electronic switches (6, 7) in such a way that a DC voltage of the desired value decreases across the capacitance (15) at the output end, and in that the transformer (11) is provided with additional taps (16, 17) at the secondary end, from which the DC power supply voltages can be derived.

38 Claims, 1 Drawing Sheet

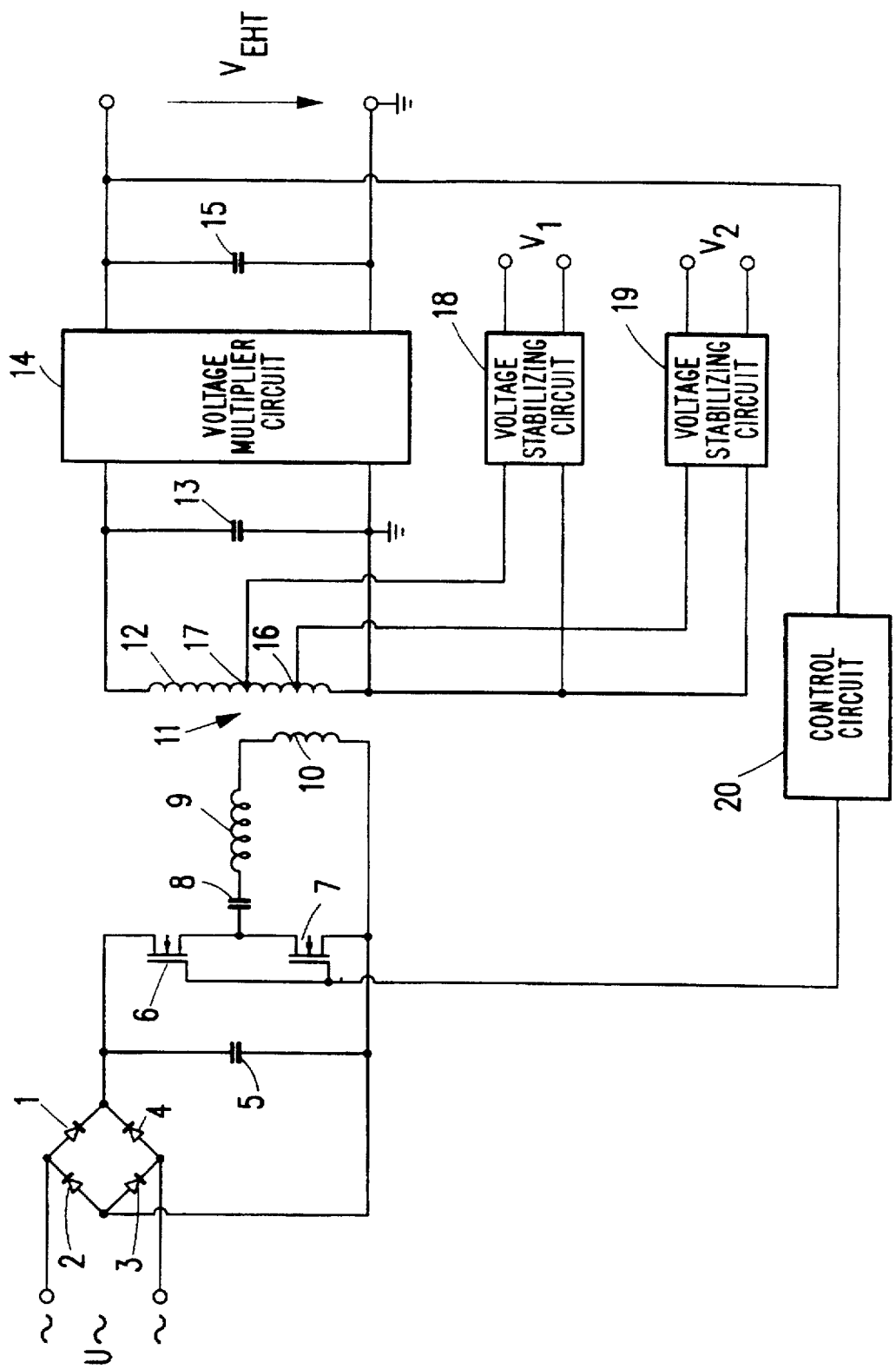

5,777,859

VOLTAGE CONVERTER

BACKGROUND OF THE INVENTION

The invention relates to a voltage converter for converting an AC input voltage into a DC high voltage and further DC power supply voltages, in which the AC voltage applied to the converter is applied to a rectifier arrangement whose output signal is coupled to two consecutively switched electronic switches, and in which this DC voltage is converted into the DC high voltage and into the DC power supply voltages.

Such voltage converters, which supply a high voltage as a DC voltage and also generally lower DC power supply voltages, are known to exist in two types.

In a first type, such converters are divided into two parts. In a first part, the power supply voltages required in the apparatus are generated. In a second, subsequently arranged part, the DC high voltage is converted from one of the voltages generated in the first part. Such power supplies have the particular drawback that they require two transformers.

In a second type of known voltage converters, high-voltage transformers are used which are based on the flyback principle. Such transformers have relatively large dimensions so that they are not applicable in many areas.

SUMMARY OF THE INVENTION

It is an object of the invention to provide a voltage converter of the type described in the opening paragraph, which has a smaller and simpler structure than the known types.

This object is solved in that a series arrangement of a capacitance, an inductance and a primary winding of a transformer is arranged in parallel with one of the electronic switches, in that a secondary winding of the transformer precedes a capacitance at the output end, in that a control circuit is provided which controls the switching frequency of the electronic switches in such a way that a DC voltage of the desired value decreases across the capacitance at the output end, and in that the transformer is provided with additional taps at the secondary end, from which the DC power supply voltages can be derived.

The DC voltage converter has a half-bridge so that a series arrangement of a capacitance, an inductance and the primary winding of the transformer is arranged in parallel with one of the connected electronic switches. The secondary winding of the transformer is arranged in parallel with a capacitance. The capacitance at the primary end, the inductance at the primary end and the capacitances at the secondary end transformed to the primary end constitute the series-parallel resonant circuit. The capacitance and inductance at the primary end are generally constructed directly, whereas the capacitance at the secondary end may be constituted by the capacitance at the output end or, at least partly, by the input capacitance of a pre-arranged high- voltage cascade which may be provided in accordance with a further embodiment of the invention. Similarly, the capacitance may be partly constituted by the secondary winding of the transformer.

A control circuit is provided which controls the switching frequency of the electronic switches in such a way that the capacitance at the output end is always charged to a desired DC high-voltage value, independent of the load to be supplied by the circuit.

The two switches which are electronically controlled at the input end are controlled by means of a square-wave signal having a high push-pull frequency. The series-parallel resonant circuit passes a substantially sinewave-shaped current through the primary winding of the transformer. At the secondary end, at least a part of this current is used for reversing the charge of the capacitance at the secondary end.

The transformer is provided with additional taps at the secondary end, from which the additional DC power supply voltages can be derived.

Due to this structure, one transformer is sufficient to generate the DC high voltage and the DC power supply voltages. The transformer has relatively small dimensions because it is controlled at both ends at a high frequency, which is in contrast to the prior-art arrangements. Simultaneously, a generally desirable mains separation of the DC high voltage and the DC power supply voltages from the mains input signal is obtained with this transformer.

A further advantage of the circuit is that it is capable of no-load operation, i.e. without any noticeable external load. To this end, the converter according to the invention, with the series-parallel resonant circuit and without an output choke is particularly suitable for this purpose.

The voltage converter can operate with high efficiency in a range between full load and no load, at a stable output voltage.

If a high-voltage cascade for voltage multiplication is arranged subsequent to the transformer, as is provided in an embodiment according to the invention, then it is possible to significantly reduce the voltage requirements imposed on the transformer.

In a further embodiment of the invention, the additional taps at the secondary end are constituted as additional taps of the secondary winding of the transformer. Then, only one winding at the secondary end is provided, from several taps of which the high DC voltage, by means of which the capacitance at the secondary end is charged, and the DC power supply voltages can be derived. The relevant taps of the one secondary winding are provided for these several voltages.

Alternatively, in a further embodiment of the invention, the additional taps at the secondary end are each connected to an associated, separate secondary winding of the transformer. In this case, the transformer has several secondary windings in conformity with the number of desired DC power supply voltages plus the DC high voltage.

In a further embodiment of the invention, the DC power supply voltages derived from the additional taps at the secondary end are applied to voltage-stabilizing circuit arrangements. The arrangement already controlled by the control circuit already supplies relatively stable power supply voltages. To stabilize these voltages even further, the DC power supply voltages derived at the secondary end from the transformer can be further stabilized.

In a further embodiment of the invention, the control circuit includes an optocoupler which is used for mains separation. For the DC high voltage and the DC power supply voltages, the mains separation is realized by the transformer. However, since the control circuit should measure the DC high voltage and must control the electronic switches which precede the transformer and the series-parallel resonant circuit, a further mains separation is necessary in this case. This can be advantageously effected by means of an optocoupler.

In a further embodiment of the invention, the circuit is controlled at a frequency above the resonance frequency of the resonant circuit constituted by the capacitance at the primary end, the inductance at the primary end and the capacitances at the secondary end transformed to the primary end.

Due to operation above the resonance frequency of the series-parallel resonant circuit, there are no turn-on losses of the electronic switches and the diodes possibly arranged parallel thereto. The turn-off losses may be further reduced by capacitors arranged parallel to the switches. As a result, the switches produce substantially only ohmic losses.

Due to the properties described above, particularly the high efficiency and the ability of the circuit to always provide the desired DC high voltage and the additional DC power supply voltages in the full control range between no load and full load, it can advantageously be used in a picture display device for controlling a picture display tube, and for generating further required DC power supply voltages.

These and other aspects of the invention will be apparent from and elucidated with reference to the embodiment described hereinafter.

BRIEF DESCRIPTION OF THE DRAWINGS

In the drawing, the sole figure shows a voltage converter according to the invention whose input receives an AC voltage denoted by U~ in the Figure. By means of a voltage converter shown in the Figure, this AC voltage should be converted into a high DC voltage which is denoted by $V_{EHT}$ in the Figure. Moreover, the voltage converter should supply, for example two DC power supply voltages of different values which are denoted by $V_1$ and $V_2$ in the Figure. It is of course possible to generate more DC power supply voltages.

DETAILED DESCRIPTION OF THE PREFERRED EMBODIMENTS

At its input end, the voltage converter is provided with a rectifier arrangement comprising four diodes 1, 2, 3 and 4 in the form of a known rectifier bridge. To stabilize its output voltage, a capacitance 5 is arranged subsequent to the rectifier arrangement. A preconditioner (not shown), which reduces the higher harmonics of the mains current consumption, may be arranged between the rectifier bridge and the capacitance 5. The series arrangement of two electronic switches 6 and 7 is connected parallel to the capacitance 5.

The electronic switches 6 and 7 may be, for example MOSFET transistors which may be provided with antiparallel diodes.

At its input end, the voltage converter is built up in the form of a half-bridge, i.e. a series arrangement of a capacitance 8, an inductance 9 and a primary winding 10 of a transformer 11 is arranged parallel to one of the two switches 6, 7 in the embodiment shown in the Figure.

At its output end, the transformer 11 has a secondary winding 12 with which a capacitance 13 is arranged in parallel.

Together with the capacitance 13 at the secondary end, the capacitance 8 and the inductance 9 at the primary end constitute the series-parallel resonant circuit.

At its secondary end, the capacitance 13 may precede a high-voltage multiplier circuit which is denoted by 14 in the Figure and may be, for example a high voltage cascade. In its turn, this high-voltage multiplier circuit 14 precedes a capacitance 15 at the output end. The capacitance 13 may be dispensed with in embodiments in which no high- voltage multiplier circuit is provided.

In addition to the end taps preceding the capacitance 13, the secondary winding 12 of the transformer 11 is provided with further sub-taps 16 and 17. Smaller voltages may be derived from these taps. In the embodiment shown in the Figure, a first DC power supply voltage is taken from the tap 17 of the secondary winding 12 of the transformer 11 and applied to a circuit arrangement 18 for voltage stabilization (not shown in detail in the Figure). This circuit arrangement 18 supplies a first DC power supply voltage $V_1$ at the output end.

In the embodiment shown in the Figure, the secondary winding 12 of the transformer 11 is further provided with an additional tap 16 at the secondary end, from which a slightly smaller voltage than that at the tap 17 can be derived. This tap 16 is coupled to a further voltage-stabilizing circuit arrangement 19, from whose output a further DC power supply voltage $V_2$ can be derived.

The voltage converter is further provided with a control circuit 20 which takes off the voltage across the capacitance 15 at the output end and controls the electronic switches 7 and 8 in such a way that the DC voltage decreasing across the capacitance 15 always has the desired value. In a corresponding manner, this also has the result that the DC power supply voltages taken from the taps 16 and 17 and made available once more in a stabilized form as DC power supply voltages $V_1$ and $V_2$, are also controlled as regards the height of their voltage value.

The capacitance 8 and the inductance 9 arranged at the primary end are generally constructed as discrete components, whereas the capacitance 13 is partly constituted by the capacitance of the secondary winding 12 of the transformer 11. The capacitance 8 and the inductance 9, as well as the value of the capacitance 13 transformed to the primary end via the transformer 11 constitute a series-parallel resonant circuit having a resonance frequency. This resonance frequency changes with the load of the circuit. The circuit is advantageously controlled by means of an operating frequency which is above the resonance frequency of the series-parallel resonant circuit.

If this is the case, a higher clock frequency of the electronic switches 6, 7, which are controlled in a corresponding manner by the control circuit 20, involves a smaller output voltage, and a lower switching frequency of the electronic switches 7 and 8, approaching the resonance frequency, involves a larger output voltage. This property may be utilized to keep the voltage value decreasing across the capacitance 15 at a desired value. This is the task of the control circuit 20 which scans the voltage value decreasing across the capacitance 15 and controls the switching frequency of the electronic switches 6 and 7 in such a way that the desired voltage value is maintained at all times.

For the constellation described above, in which the switching frequency of the electronic switches 6 and 7 is above the resonance frequency of the series-parallel resonant circuit, this means that the switching frequency of the electronic switches 6 and 7 is lowered at a too small voltage value across the capacitance 15. In the opposite case, this switching frequency is raised. This provides the possibility of controlling the circuit both in full-load and in no-load operation, with the output voltage remaining constant at all times.

This renders the circuit arrangement according to the invention particularly suitable for controlling a picture display tube in which, independent of the load, i.e. of the picture contents, a constant DC voltage can be supplied at all times.

Moreover, the circuit arrangement supplies further DC power supply voltages $V_1$ and $V_2$ which may be required in the same apparatus.

The circuit arrangement has a relatively simple structure with only one transformer which simultaneously ensures the mains separation for the required voltages.

As regards its magnetic material, the transformer is driven to its full range at both polarities, so that it may be of a relatively small design. A high-voltage multiplier circuit 14 is provided in the embodiment shown in the Figure. In this case, the capacitance 13, which precedes the multiplier circuit 14, constitutes, transformed to the primary end, an element of the series-parallel resonant circuit. The voltage made available by the circuit arrangement at the output end decreases across the capacitance 15 arranged subsequent to the multiplier circuit 14. If the circuit arrangement does not have a multiplier circuit 14, only one capacitance may be provided which, transformed to the primary end, is an element of the series-parallel resonant circuit and simultaneously represents that output capacitance across which the desired DC high voltage decreases.

It should now be apparent that the objects of the present invention have been satisfied in all respects. Further, while the present invention has been described in particular detail, it also should be appreciated that its principles have broad general applicability. Consequently, numerous modifications are possible in the details given within the intended spirit and scope of the invention.

I claim:

1. The voltage converter for converting an AC input voltage into a DC high voltage and further DC power supply voltages, in which the AC voltage applied to the converter is applied to a rectifier arrangement (1, 2, 3, 4) whose output signal is coupled to two consecutively switched electronic switches (6, 7), and in which this DC voltage is converted into the DC high voltage and into the DC power supply voltages, characterized in that a series arrangement of a capacitance (8), an inductance (9) and a primary winding (10) of a transformer (11) is arranged in parallel with one of the electronic switches (6, 7), in that a secondary winding (12) of the transformer (11) precedes a capacitance (15) at the output end, in that a control circuit (20) is provided which controls the switching frequency of the electronic switches (6, 7) in such a way that a DC voltage of the desired value decreases across the capacitance (15) at the output end, and in that the transformer (11) is provided with additional taps (16, 17) at the secondary end, from which the DC power supply voltages can be derived.

2. The voltage converter as claimed in claim 1, characterized in that a high voltage multiplier circuit (14) precedes the capacitance (15) at the output end.

3. The voltage converter as claimed in claim 1, characterized in that the additional taps (16, 17) at the secondary end are constituted as additional taps of the secondary winding (12) of the transformer (11).

4. The voltage converter as claimed in claim 1, characterized in that the additional taps (16, 17) at the secondary end are each connected to an associated, separate secondary winding of the transformer (11).

5. The voltage converter as claimed in claim 1, characterized in that the DC power supply voltages derived from the additional taps (16, 17) at the secondary end are applied to voltage-stabilizing circuit arrangements (18, 19).

6. The voltage converter as claimed in claim 1, characterized in that the control circuit (20) includes an optocoupler which is used for mains separation.

7. The voltage converter as claimed in claim 1, characterized in that the rectifier arrangement precedes a circuit arrangement which reduces the higher harmonics of the AC voltage.

8. The voltage converter as claimed in claim 1, characterized in that the circuit is controlled at a frequency above the resonance frequency of the resonant circuit constituted by the capacitance (8) at the primary end, the inductance (9) at the primary end and the capacitances (13; 15) at the secondary end transformed to the primary end.

9. The voltage converter as claimed in claim 1 in a picture display device for controlling a picture display tube, and for generating further DC power supply voltages.

10. The voltage converter as claimed in claim 2, characterized in that the additional taps (16, 17) at the secondary end are constituted as additional taps of the secondary winding (12) of the transformer (11).

11. The voltage converter as claimed in claim 2, characterized in that the additional taps (16, 17) at the secondary end are each connected to an associated, separate secondary winding of the transformer (11).

12. The voltage converter as claimed in claim 3, characterized in that the additional taps (16, 17) at the secondary end are each connected to an associated, separate secondary winding of the transformer (11).

13. The voltage converter as claimed in claim 10, characterized in that the additional taps (16, 17) at the secondary end are each connected to an associated, separate secondary winding of the transformer (11).

14. The voltage converter as claimed in claim 2, characterized in that the DC power supply voltages derived from the additional taps (16, 17) at the secondary end are applied to voltage-stabilizing circuit arrangements (18, 19).

15. The voltage converter as claimed in claim 3, characterized in that the DC power supply voltages derived from the additional taps (16, 17) at the secondary end are applied to voltage-stabilizing circuit arrangements (18, 19).

16. The voltage converter as claimed in claim 4, characterized in that the DC power supply voltages derived from the additional taps (16, 17) at the secondary end are applied to voltage-stabilizing circuit arrangements (18, 19).

17. The voltage converter as claimed in claim 2, characterized in that the control circuit (20) includes an optocoupler which is used for mains separation.

18. The voltage converter as claimed in claim 3, characterized in that the control circuit (20) includes an optocoupler which is used for mains separation.

19. The voltage converter as claimed in claim 4, characterized in that the control circuit (20) includes an optocoupler which is used for mains separation.

20. The voltage converter as claimed in claim 5, characterized in that the control circuit (20) includes an optocoupler which is used for mains separation.

21. The voltage converter as claimed in claim 2, characterized in that the rectifier arrangement precedes a circuit arrangement which reduces the higher harmonics of the AC voltage.

22. The voltage converter as claimed in claim 3, characterized in that the rectifier arrangement precedes a circuit arrangement which reduces the higher harmonics of the AC voltage.

23. The voltage converter as claimed in claim 4, characterized in that the rectifier arrangement precedes a circuit arrangement which reduces the higher harmonics of the AC voltage.

24. The voltage converter as claimed in claim 5, characterized in that the rectifier arrangement precedes a circuit arrangement which reduces the higher harmonics of the AC voltage.

25. The voltage converter as claimed in claim 6, characterized in that the rectifier arrangement precedes a circuit arrangement which reduces the higher harmonics of the AC voltage.

26. The voltage converter as claimed in claim 2, characterized in that the circuit is controlled at a frequency above the resonance frequency of the resonant circuit constituted by the capacitance (8) at the primary end, the inductance (9) at the primary end and the capacitances (13; 15) at the secondary end transformed to the primary end.

27. The voltage converter as claimed in claim 3, characterized in that the circuit is controlled at a frequency above the resonance frequency of the resonant circuit constituted by the capacitance (8) at the primary end, the inductance (9) at the primary end and the capacitances (13; 15) at the secondary end transformed to the primary end.

28. The voltage converter as claimed in claim 4, characterized in that the circuit is controlled at a frequency above the resonance frequency of the resonant circuit constituted by the capacitance (8) at the primary end, the inductance (9) at the primary end and the capacitances (13; 15) at the secondary end transformed to the primary end.

29. The voltage converter as claimed in claim 5, characterized in that the circuit is controlled at a frequency above the resonance frequency of the resonant circuit constituted by the capacitance (8) at the primary end, the inductance (9) at the primary end and the capacitances (13; 15) at the secondary end transformed to the primary end.

30. The voltage converter as claimed in claim 6, characterized in that the circuit is controlled at a frequency above the resonance frequency of the resonant circuit constituted by the capacitance (8) at the primary end, the inductance (9) at the primary end and the capacitances (13; 15) at the secondary end transformed to the primary end.

31. The voltage converter as claimed in claim 7, characterized in that the circuit is controlled at a frequency above the resonance frequency of the resonant circuit constituted by the capacitance (8) at the primary end, the inductance (9) at the primary end and the capacitances (13; 15) at the secondary end transformed to the primary end.

32. The voltage converter as claimed in claim 2 in a picture display device for controlling a picture display tube and for generating further DC power supply voltages.

33. The voltage converter as claimed in claim 3 in a picture display device for controlling a picture display tube and for generating further DC power supply voltages.

34. The voltage converter as claimed in claim 4 in a picture display device for controlling a picture display tube and for generating further DC power supply voltages.

35. The voltage converter as claimed in claim 5 in a picture display device for controlling a picture display tube and for generating further DC power supply voltages.

36. The voltage converter as claimed in claim 6 in a picture display device for controlling a picture display tube and for generating further DC power supply voltages.

37. The voltage converter as claimed in claim 7 in a picture display device for controlling a picture display tube and for generating further DC power supply voltages.

38. The voltage converter as claimed in claim 8 in a picture display device for controlling a picture display tube and for generating further DC power supply voltages.

* * * * *

UNITED STATES PATENT AND TRADEMARK OFFICE
CERTIFICATE OF CORRRECTION

PATENT NO. : 5,777,859
DATED : July 7, 1998
INVENTOR(S) : Hubert Raets It is certified that error appears in the above-identified patent and that said Letters Patent is hereby corrected as shown below:

On the title page, add the following references:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 3 | 5 | 9 | 6 | 1 | 6 | 5 | 7/21/71 | Andrews | | | |
| | | 4 | 4 | 8 | 4 | 1 | 1 | 3 | 11/20/84 | Haferl | | | |
| | | 4 | 5 | 8 | 6 | 1 | 1 | 9 | 4/29/86 | Sutton | | | |
| | | 4 | 6 | 0 | 4 | 5 | 5 | 6 | 8/5/86 | Haferl | | | |

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | | 9 | 4/ | 2 | 1 | 0 | 2 | 9 | 9/15/94 | Autria | | | | |

Signed and Sealed this

Sixteenth Day of March, 1999

*Attest:*

*Attesting Officer*

Q. TODD DICKINSON

*Acting Commissioner of Patents and Trademarks*